(12) United States Patent
Ament et al.

(10) Patent No.: US 6,616,389 B1
(45) Date of Patent: Sep. 9, 2003

(54) STORAGE FACILITY FOR A MOTOR VEHICLE AND SEGMENTATION DEVICE

(75) Inventors: Eduard Ament, Aichwald (DE); Holger Seel, Aidlingen (DE); Werner P. Schlecht, Vaihingen (DE); Marina Ehrenberger, Esslingen (DE)

(73) Assignee: BOS GmbH & Co. KG, Aichwald (DE)

( * ) Notice: Subject to any disclaimer, the term of this patent is extended or adjusted under 35 U.S.C. 154(b) by 0 days.

(21) Appl. No.: 09/673,031

(22) PCT Filed: Mar. 11, 1999

(86) PCT No.: PCT/EP99/01570

§ 371 (c)(1),
(2), (4) Date: Jan. 11, 2001

(87) PCT Pub. No.: WO99/52740

PCT Pub. Date: Oct. 21, 1999

(30) Foreign Application Priority Data

| Apr. 8, 1998 | (DE) | 198 15 733 |
| May 11, 1998 | (DE) | 198 20 726 |
| Aug. 19, 1998 | (DE) | 198 37 685 |

(51) Int. Cl.$^7$ .................................................. B60P 7/14
(52) U.S. Cl. ................... 410/118; 410/129; 410/135; 410/97; 410/100
(58) Field of Search ................ 410/135, 140, 410/129, 117, 118, 97, 100; 224/42.33, 42.34; 220/531, 557; 296/37.5, 37.6, 24.1

(56) References Cited

U.S. PATENT DOCUMENTS

| 2,594,208 | A | * | 4/1952 | Pilot .......................... 410/129 |
| 2,772,641 | A | * | 12/1956 | Roberts et al. |
| 3,057,284 | A | * | 10/1962 | Learmont |
| 3,438,673 | A | * | 4/1969 | Nelson .......................... 410/99 |
| 4,507,033 | A | * | 3/1985 | Boyd |
| 5,026,231 | A | * | 6/1991 | Moore .......................... 410/118 |
| 5,427,486 | A | * | 6/1995 | Green .......................... 410/118 |
| 5,632,520 | A | * | 5/1997 | Butz .......................... 410/118 X |
| 5,685,470 | A | | 11/1997 | Moore |
| 5,697,742 | A | * | 12/1997 | House .......................... 410/127 |
| 5,800,145 | A | * | 9/1998 | Kelce .......................... 410/142 |
| 6,007,283 | A | * | 12/1999 | Labeur .......................... 410/97 |
| 6,039,521 | A | * | 3/2000 | Sullivan .......................... 410/118 |
| 6,183,177 | B1 | * | 2/2001 | Dahlgren .......................... 410/100 |

FOREIGN PATENT DOCUMENTS

| DE | 3147785 | 6/1983 |
| DE | 3433080 | 3/1986 |
| DE | 4128701 | 3/1992 |
| DE | 4234812 | 4/1994 |
| DE | 4239470 | 5/1994 |
| DE | 19738130 | 2/2001 |
| EP | 0647547 | 4/1995 |
| EP | 0667260 | 8/1995 |
| FR | 2755655 | 5/1998 |
| FR | 2767099 | 2/1999 |
| GB | 2261856 | 6/1993 |
| GB | 2310173 | 8/1997 |

* cited by examiner

Primary Examiner—Stephen T. Gordon
(74) Attorney, Agent, or Firm—Crowell & Moring LLP

(57) ABSTRACT

In a freight compartment for a motor vehicle, with a cargo net for holding transported goods on a freight compartment floor, at least one sectioning device is provided for dividing the freight compartment into at least two spaces. Such construction can be used in passenger cars of the sedan type.

14 Claims, 10 Drawing Sheets

STORAGE FACILITY FOR A MOTOR VEHICLE AND SEGMENTATION DEVICE

BACKGROUND AND SUMMARY OF THE INVENTION

The invention relates to a freight compartment for a motor vehicle as well as a sectioning device therefor.

It is known to provide attaching eyes on a freight floor of a freight compartment of a motor vehicle, by means of which lashing devices can be fixed in position on the vehicle, and which hold packages on the freight compartment floor.

It is the problem of the invention to create a freight compartment as well as a sectioning device of the kind referred to above which will permit improved utilization of the freight compartment.

This problem is solved for the freight compartment in that at least one sectioning device is provided for dividing the freight compartment into at least two spaces. The sectioning device can be in the form of a simple divider or of a complex device by providing at least one flexible or at least partially stiff divider in a corresponding enclosure. Preferably, at least one divider of the at least one sectioning device serves for the vertical separation of the freight compartment into at least two sections of space adjoining one another in the direction of the vehicle's length and/or transversely thereof.

In an embodiment of the invention the sectioning device has at least one divider that is flexible or at least of stable shape in sections, which can be shifted between a rest position and an active position, and which in its active position divides the freight compartment into at least two sections of space, the at least one divider being sunken in its rest position in at least one recess in a boundary surface of the freight compartment, especially in a freight compartment floor. The divider is thus housed in its rest position in the freight compartment so compactly and invisibly that the entire volume of the freight compartment is available for loading and unloading. The configuration is especially advantageous for a trunk compartment situated in a rear deck of a passenger car. The divider can be mounted or housed either in its own housing or directly in the recess. In addition to the freight compartment floor, the sides of the freight compartment, including the front and rear sides as well as the roof of the freight compartment, which in a passenger car is situated directly under a back shelf of the vehicle's interior, also serve as defining surfaces.

In a further embodiment of the invention the at least one recess in the boundary surface can be closed by at least one cover. This cover can be matched in its dimensions to the dimensions of the opening of the recess. However, it can also be a section of a larger surface covering which forms a lining of the corresponding boundary surface. For this purpose a floor carpet or a wide wall liner can be provided.

In a further embodiment of the invention, a side wall of the freight compartment is provided as a boundary surface, and a flap turning on a hinge which can be locked in the closed covering position by a locking device is provided to serve as a roof. Simple releasable catches, bolts, hook-and-loop closures, pushbuttons or other releasable devices can be provided as locking devices.

According to the invention the sectioning device is provided with at least one flexible dividing wall or one that is at least stable in shape in sections, which can be aligned and affixed to the vehicle in the freight compartment. The divider in that case can preferably be shifted to different positions, and can be locked especially in a space-saving rest position and in a space dividing active position. The term, freight compartment, also includes a trunk compartment for sedans or fastback passenger cars.

In an embodiment of the sectioning device, the divider has a frame of stable shape which is mounted for swiveling on the wall of the freight compartment between a rest position lying against the wall and an active position dividing the freight compartment into at least two space sections. The sectioning device is preferably provided for the trunk compartment of a sedan, the frame in that case being advantageously arranged on a roof of the trunk compartment and swung down to its active position. In its active position the frame extends over the entire height of the trunk compartment between the trunk compartment floor and the roof of the trunk compartment, so that a division of the trunk compartment is created by the frame. The frame is preferably mounted so as to be able to turn on an axis running transversely in the vehicle. However, it can also be arranged to turn about an axis in line with the length of the vehicle, so that in its active position it divides a section of space underneath the roof of the trunk compartment into two sections parallel and side-by-side lengthwise of the vehicle.

In a further embodiment of the invention, locking means are provided on the frame which fix the frame in its active position on corresponding holding means affixed to the freight compartment. These locking means are preferably catches easily operated by hand, which either snap into their locking position on the holding means—preferably spring-loaded—affixed to the freight compartment, or are shifted manually into the locking position. The locking means are released likewise by hand.

In a further embodiment of the invention, means for securing the frame in its rest position lying against the wall are associated with the frame. These securing means can be in the form of simple turning hooks, pawls or locks, all releasable manually. It is also possible to integrate such securing and locking means for fixing the frame in its active position and in its rest position directly into a hinge system for swiveling the frame on the wall of the freight compartment. A manually releasable pawl unit is especially suitable which is associated with a ratchet wheel which can rotate about the pivot axis together with the frame.

In a further embodiment of the invention, the frame is provided on at least one side with a holding bar on which additional functional devices can be releasably fastened. Such additional functional devices can be provided in various forms. For example, a box holding a concealing tarpaulin or security roller shade can be affixed to the holding bar. It is also possible to fasten additional sectioning units releasably to the holding bar, which only divide the freight compartment floor without reaching up to the full height of the freight compartment. The functional devices can also be receivers or containers for different kinds of materials to be carried in the vehicle.

In a further embodiment of the invention, at least one sectioning unit that can be aligned transversely of the active position of the frame is provided as a functional unit.

In a further embodiment, the sectioning unit is a barrier loop which is disposed on a supporting post which can be moved along its mounting profile. At the same time only one single barrier loop may be provided on the mounting profile of the frame. However, two or more barrier loops can be provided. Due to the ability of the at least one barrier loop to be shifted linearly it is possible to make the sections of the freight compartment variable according to the goods that are to be transported.

In a further embodiment of the invention, means are associated with the at least one barrier loop to lock the barrier loop in any desired intermediate position. This assures that the barrier loop is locked in the position established on the mounting profile and thus on the frame. The barrier loop extends preferably over only a portion of the height of the frame and thus only over a part of the height of the trunk or freight compartment.

In a further development of the invention a clamping bar extending at least approximately over the entire length of the mounting profile is provided, which is associated with the supporting post and is recessed at least partially in the holding bar and can pivot around its longitudinal axis, the clamping bar being configured off-center at least in sections from its longitudinal axis such that the supporting post can be locked or released when the holding bar is turned relative to the holding bar. This embodiment is advantageous especially when more than one barrier loop is provided, since all of the barrier loops together can be locked or released for longitudinal displacement by turning the holding bar. The holding bar is provided preferably at a central point with a gripping element by which the holding bar can be turned manually and thus operated to release or lock the supporting posts. It is thus possible by a single hand operation to release or lock the holding bar and thus the at least one barrier loop.

In a further embodiment of the invention, the at least one barrier loop is mounted on its associated mounting post for turning between a folded rest position to a deployed active position. This assures that the at least one barrier loop is compactly arranged in its rest position on the frame. The at least one barrier loop can thus be turned together with the frame to its rest position.

Additional advantages and features of the invention are to be found in the following description of embodiments of the invention, some of which are represented in the drawings.

DETAILED DESCRIPTION OF THE DRAWINGS

Figure 1:
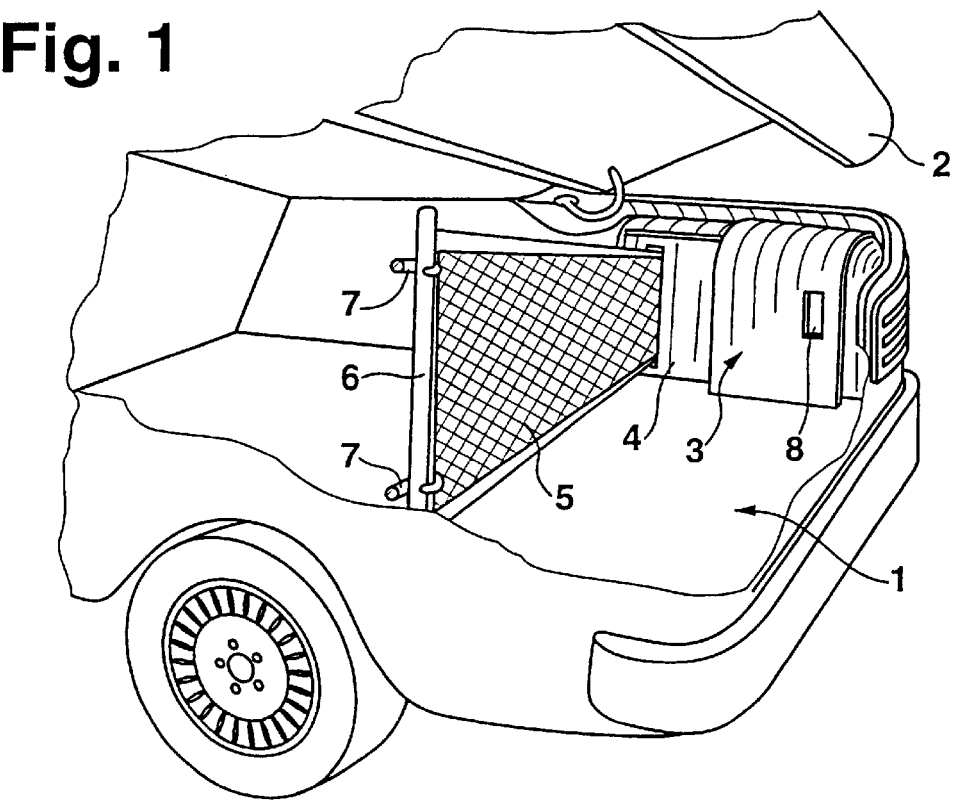
FIG. 1 is a perspective view of a partially cut-away trunk compartment serving as an embodiment of a freight compartment according to the invention for a passenger car in which an embodiment of the sectioning device of the invention is arranged.

A freight compartment in the form of a trunk compartment 1 for a passenger car of the sedan type is defined at the top in a known manner by a hinged trunk compartment lid 2. To divide the trunk compartment 1 into two sections adjoining one another lengthwise of the vehicle, a box-like housing 4 is provided in the right side wall of the trunk compartment, as seen in the normal traveling direction; this housing is a part of a sectioning device and is provided with a retractable curtain 5. The curtain 5 is flexible in the embodiment represented and can be wound up on a vertically disposed roller shaft. The curtain 5 is automatically withdrawn into the rest position retracted into the housing 4 by a return spring if it is not affixed to the vehicle. To affix it to the vehicle two holding means in the form of hooks 7 are provided on the opposite side wall of the trunk compartment, into which a frame member 6 at the leading end of the curtain can be hung.

The housing 4 of the sectioning device positioned on the side wall can be closed by a sliding door 3 which is provided with a hand-hold 8 for the purpose of pushing the sliding door 3 in the lengthwise direction of the car. The sliding door 3 has corresponding guiding means attached to the vehicle and in the embodiment represented it is arcuately recurved at its upper end. The housing 4 can thus be completely concealed by the sliding door, including the curtain 5 and the frame member 6, which are withdrawn into the rest position, and can be uncovered by shifting the sliding door 3.

The sectioning device in the side wall of the trunk compartment 1 can have a different kind of barrier. For example, accordion-fold devices, or stable separating grilles which can slide together or apart, can be provided. Such sectioning devices can also be disposed in various ways in the trunk compartment 1. It is also possible to move such sectioning devices lengthwise of the vehicle between their active and rest positions. The barriers are affixed to the vehicle both in their active position and in their rest position. The barriers including the sectioning devices can also be disposed releasably within the trunk compartment, and can thus be designed for removal from the vehicle.

Figure 2:
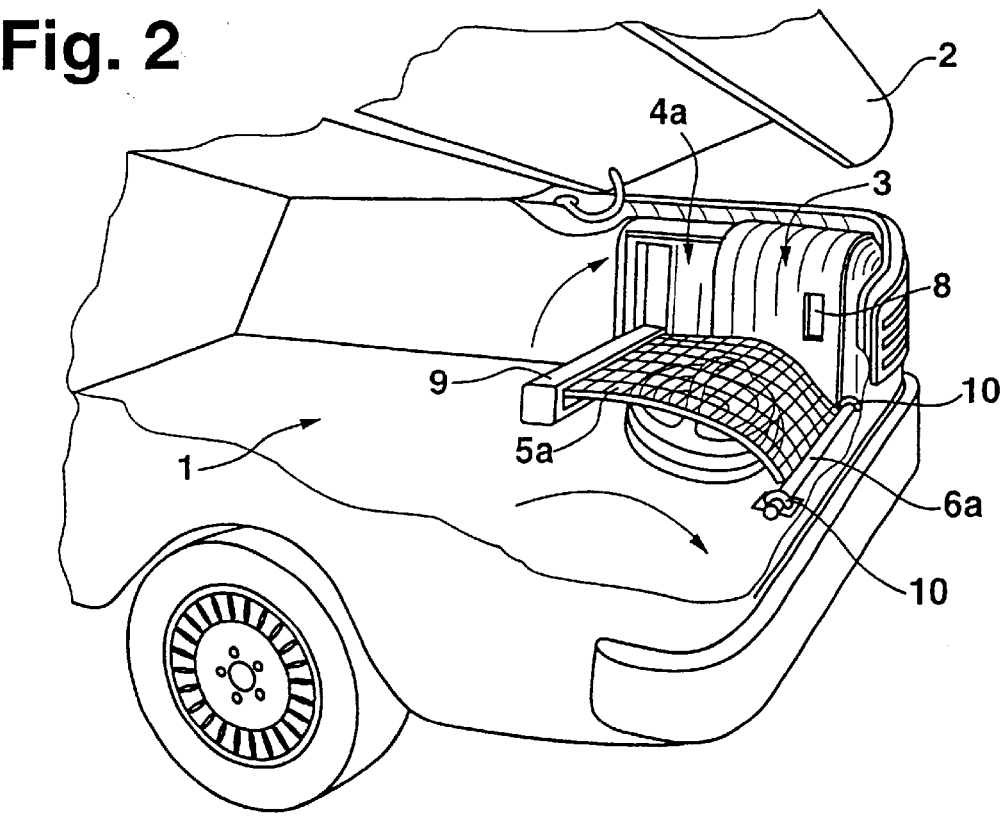
FIG. 2 shows a trunk compartment similar to FIG. 1, with an additional embodiment of a sectioning device of the invention.

In the embodiment in FIG. 2 a sectioning device is likewise arranged in a side wall section 4*a* of the trunk compartment 1 and can be concealed in its rest position by a sliding door 3. The sectioning device has a box housing 9 which is mounted so as to swing between a rest position concealed in the side wall 4*a* and an active position lying on the trunk compartment floor. The axis of its rotation is preferably near a bottom side section of the box housing 9. The box housing 9 is, in a manner not represented, also locked in its active position according to FIG. 2 on the floor of the trunk compartment 1. The box housing 9 has a divider in the form of a roll-up mesh curtain 5*a* which is wound up inside of the box housing 9 in a manner basically known. A pull-out rod 6*a* of the roll-up mesh curtain 5*a* can be releasably affixed in holding eyes 10 affixed to the floor of the trunk compartment 1. Such holding means in the form of eyes 10 or differently configured holding means can also be provided on other wall sections of the trunk compartment 1, so that the barrier can be stretched out in other positions as well. Of course, the box housing 9 can also be locked in its concealed position retracted in the side wall 4*a*. Such locking can also be accomplished by closing it by means of the sliding door 3. Additional barriers or functional units can be contained in a manner similar to the embodiments described below.

It is also possible to make the sectioning device a telescoping device, so that the sectioning device could be extended like the box housing 9 of FIG. 2, even over the entire width of the trunk compartment floor.

It is also possible to provide at least one additional sectioning device, especially in the opposite side wall of the trunk compartment 1 like the embodiment in FIG. 2, so that by means of the two box housings the entire width of the trunk compartment floor can be covered at least mostly by the sectioning devices.

Figure 3:
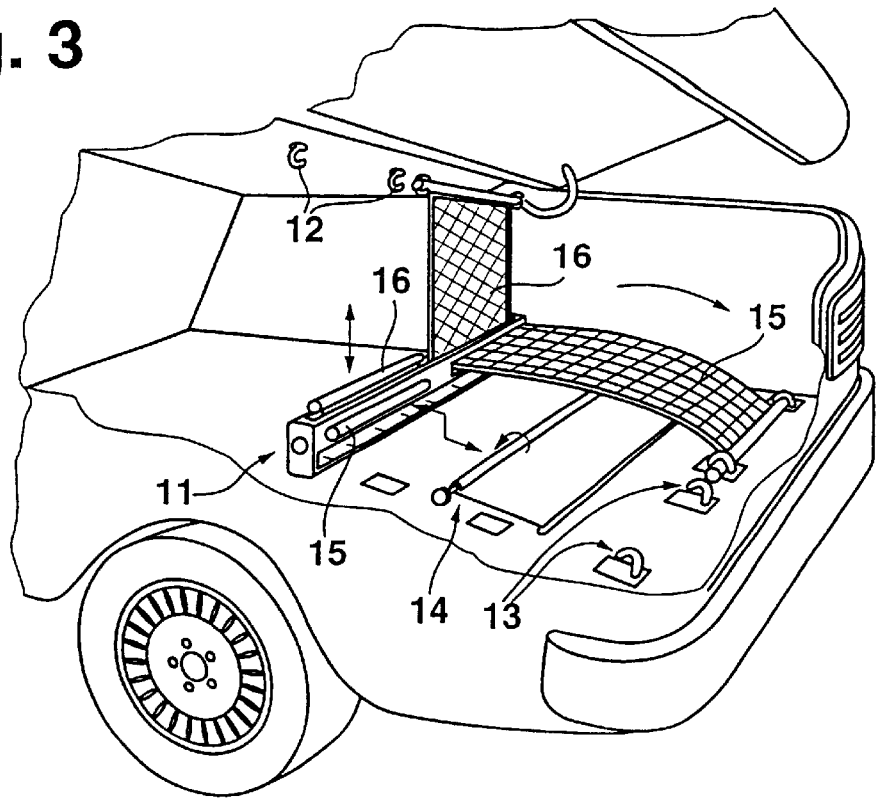
FIG. 3 shows a trunk compartment similar to FIGS. 1 and 2 with another embodiment of a sectioning device of the invention which has several functions.
Figure 4:
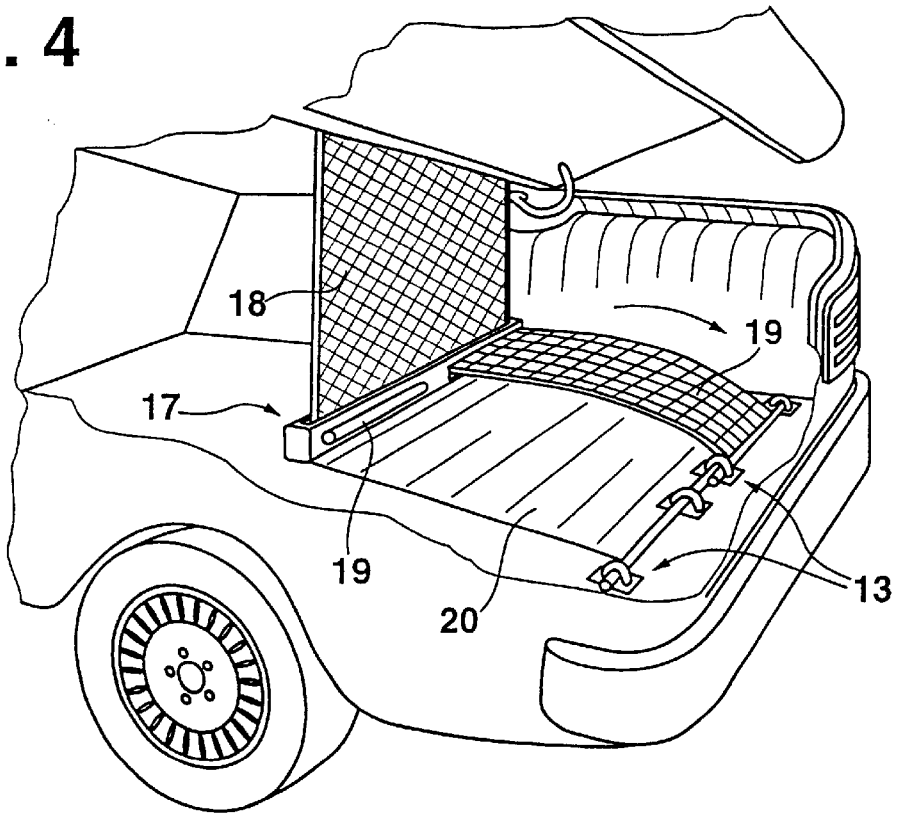
FIG. 4 shows a trunk compartment similar to FIG. 3 which a sectioning device similar to FIG. 3.
Figure 5:
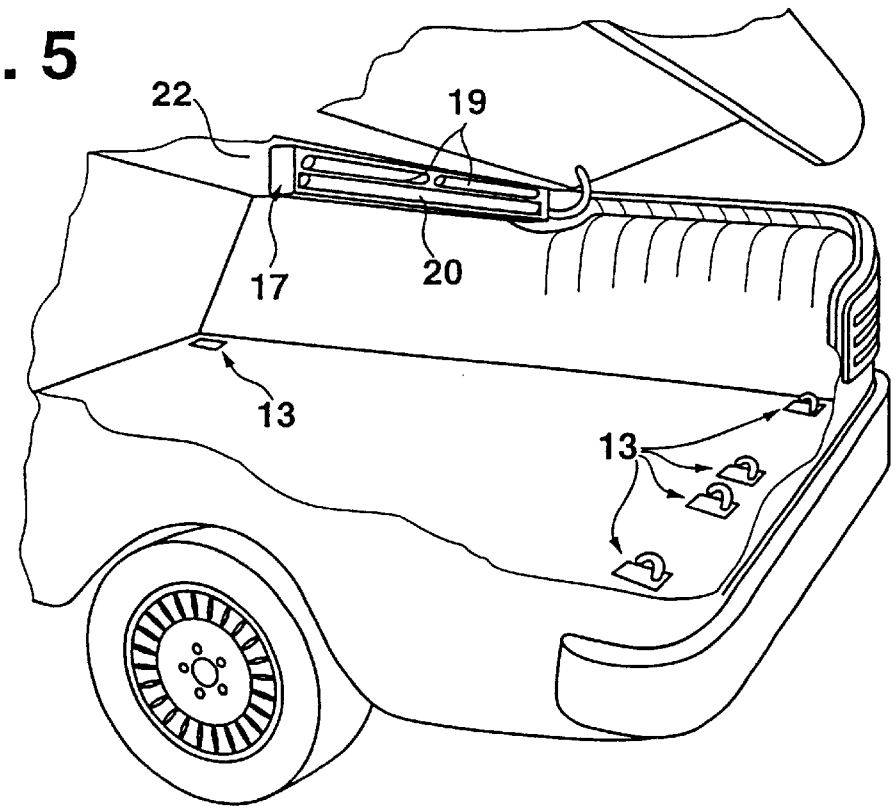
FIG. 5 shows a trunk compartment similar to FIG. 4 with another embodiment of a sectioning device of the invention similar to FIG. 4.

A sectioning device according to FIG. 3 for a trunk compartment of a passenger automobile has a box housing 11 which can be made from an aluminum extrusion or from a stable plastic of high impact strength. The box housing 11 can be fastened to the trunk compartment floor. For this purpose appropriate moldings can be provided in the floor, into which the matching moldings on the box housing 11 can be inserted. It is also possible, however, to fasten the box housing 11 to the floor of the trunk compartment by other fastening means. The box housing 11 has a plurality of function units. Thus, in an upper part, two curtains 16 can be provided side by side across the width of the vehicle, being configured as mesh-like roller shades in the embodiment represented. The roller barriers are disposed on two rollers coaxial with one another but journaled independently and provided each with its own retracting spring. Front end pull-out bars of the rollers 16 can be fastened releasably on hooks 12 affixed to the vehicle.

The entire box housing 11 can, if necessary, be released from the trunk compartment floor and be stored away in an appropriate place in the trunk compartment, in the vehicle, or outside of the vehicle.

The box housing 11 has two additional retractable barriers 15, which in this embodiment again are roller shade-like meshes. For these roller shades 15 a pull-out slot running on one side is provided in the box housing 11, so that the barriers 15 can be drawn out approximately horizontally from the box housing 11. Instead of two barriers 15 only a single barrier can also be provided, which extends over the entire width of the trunk compartment floor and thus over nearly the entire length of the box housing 11.

The barriers 15 can be affixed to the vehicle by their front pull-out rods in eyes 13 on the trunk compartment floor.

In the embodiment represented the box housing 11 is positioned at approximately the middle of the length of the trunk compartment floor. It is also possible, however, to anchor the box housing 11 elsewhere on the trunk compartment floor, to achieve different divisions of the trunk compartment space. Also, the eyes 13 serving as holding means do not necessarily have to be arranged on a back end of the trunk compartment floor. Depending on the position of the box housing 11 and the part of the space to be covered by the barrier 15, they can be positioned accordingly. It is also possible to provide the holding means in the form of eyes 13 or other kinds of fastening elements on side walls of the trunk compartment.

Underneath the barriers 15, which are journaled in the box housing 11 like barriers 16, an additional space extending over the entire length of the box housing 11 is provided in which a roll-up tarpaulin 14 can be contained. The tarpaulin 14 is disposed removably in the recess and if necessary it is removed from the box housing 11. The tarpaulin 14 serves to protect the trunk compartment floor against dirt, and it is advantageously waterproof. The tarpaulin 14 has a holding bar at each end by which the tarpaulin 14 can be stretched out on the trunk compartment floor. Depending on the arrangement of various holding means on the trunk compartment floor, the tarpaulin 14, whose total length is approximately equal to the total length of the trunk compartment floor, can be rolled out just partially or completely and accordingly attached to the trunk compartment floor so as to cover it partially or completely.

Preferably, a mounting rod of the tarpaulin 14 has journaling means at its ends by which the rod can rotate in corresponding bearing means within the opening in the box housing 11 but is releasably held in position. As an alternative to complete removal of the tarpaulin 14 it can thus also be removed from the box housing 11 by its opposite mounting rod.

The embodiment in FIGS. 4 to 7 is similar to the embodiment in FIG. 3. The sectioning device has a box housing 17 which is provided with a barrier 18 extending over the entire length of the box housing 17. The barrier 18 thus extends over nearly the entire width of the trunk compartment. The barrier 18, which is of a mesh-like nature, is fixedly anchored in a manner not further indicated by its upper end to the roof area of the trunk compartment. This fixed anchoring, however, can be made releasably so that the entire box housing 17 can be removed. The barrier 18 is wound on a roller shaft in the box housing 17 which is biased by a return spring. The return spring is provided with such strength that the barrier 18 can be rolled into the rest position against the weight of the box housing 17 including any additional function units such as additional barriers 19, a tarpaulin 20, etc. Since the barrier 18 is fixedly anchored to the roof of the trunk compartment, the box housing 17 is thus held in its rest position on the roof 22 seen in FIGS. 5 to 7, by the strength of the return spring or of the roller shaft of the tarpaulin 18. To shift the box housing 17 to its active position seen in FIG. 4, it can be pressed downward by hand and locked onto holding means within the trunk compartment floor area. The holding means can be similar to the embodiments previously described.

Alternatively it is possible to associate with the return spring for the barrier 18 a locking system which can be activated or deactivated. If such a locking system is provided, the force of the return spring can be designed to be weaker. The positioning of the box housing 17 in its rest position on the roof 22 is then performed by activating the locking system accordingly.

Figure 6:
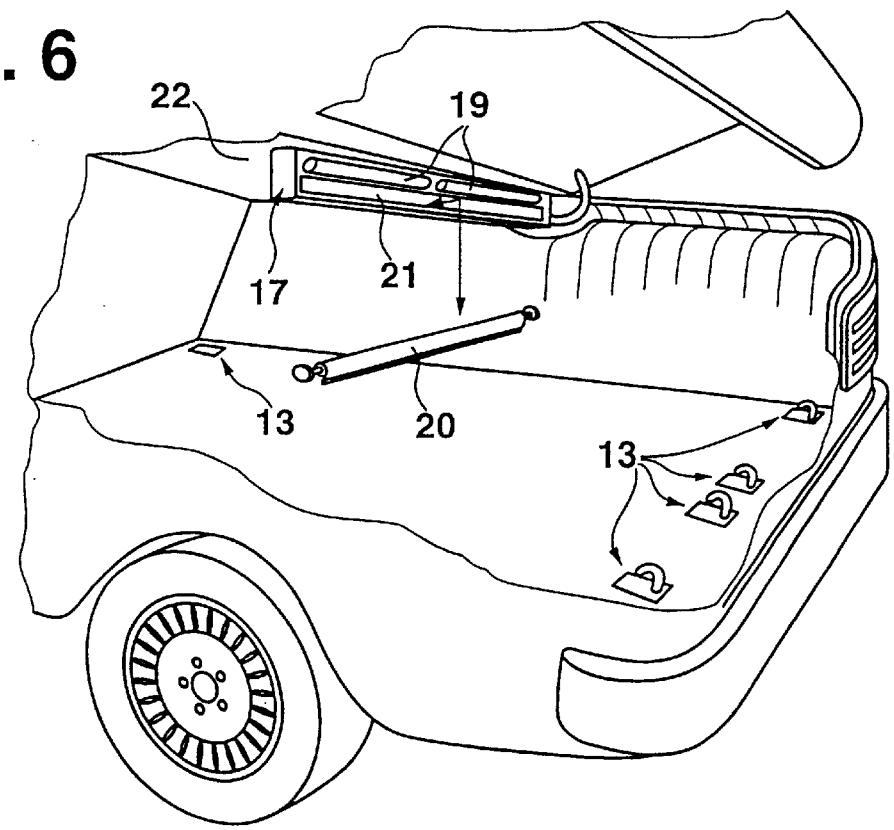
FIG. 6 shows the trunk compartment of FIG. 5 with the sectioning device of FIG. 5, from which a concealing curtain configured like a roller shade for a trunk compartment floor is removed.
Figure 7:
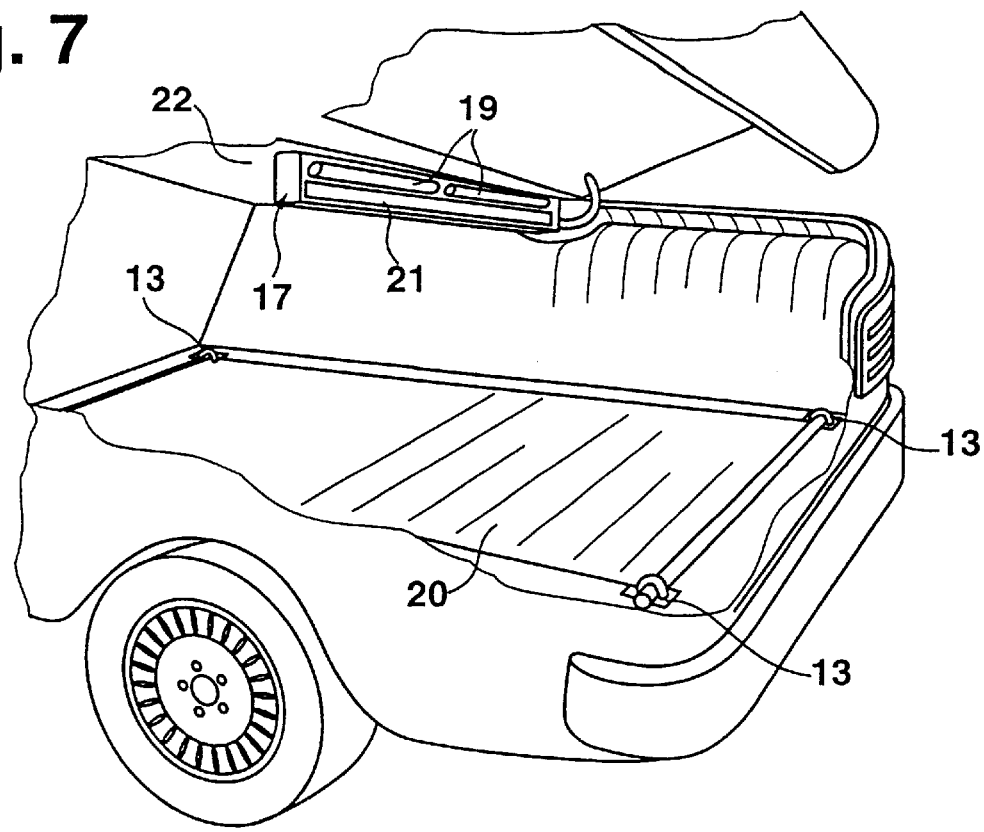
FIG. 7 shows the trunk compartment of FIG. 6, wherein the concealing curtain is in its deployed position covering the trunk compartment floor.

The barriers 19 which can be drawn out approximately horizontally and which are likewise mounted within the box housing 17 correspond to the barriers 15 described in connection with FIG. 3, so there is no need to discuss them further. The tarpaulin 20 is configured similar to tarpaulin 14 in FIG. 3 and likewise serves to keep water and dirt off the trunk compartment floor. The tarpaulin 20 in the embodiment in FIGS. 4 to 7 is mounted like the tarpaulin 14 for rotation in the recess 21 of the box housing 17 so that it can be extracted by means of the front holding rod. Alternatively, the entire tarpaulin 20, as represented in FIGS. 6 and 7, can be removed from the box housing 17 and stretched over the trunk compartment floor. Holding means 13 affixed to the vehicle are provided for this purpose in the front and rear area of the trunk compartment floor.

A box housing similar to box housing 17 can also be fastened releasably directly to the upper roof 22 without fixation by means of the barrier 18. The arrangement of the box housing 17 on the roof 22 can be configured like the fixation of the previously described box housing on the trunk compartment floor. The box housings can also be provided with sockets or fastening means for the arrangement and fixation of additional function elements. Simple receptacles for shopping bags or baskets or for other objects not pertaining to the vehicle can also be provided. For this purpose such a box housing can be provided especially with matching external shapes into which mating inserts, provided with holders or fastening units or objects, can be fitted and positively held therein. This embodiment can be made to special advantage if the box housing is made from an extruded profile.

Figure 8:
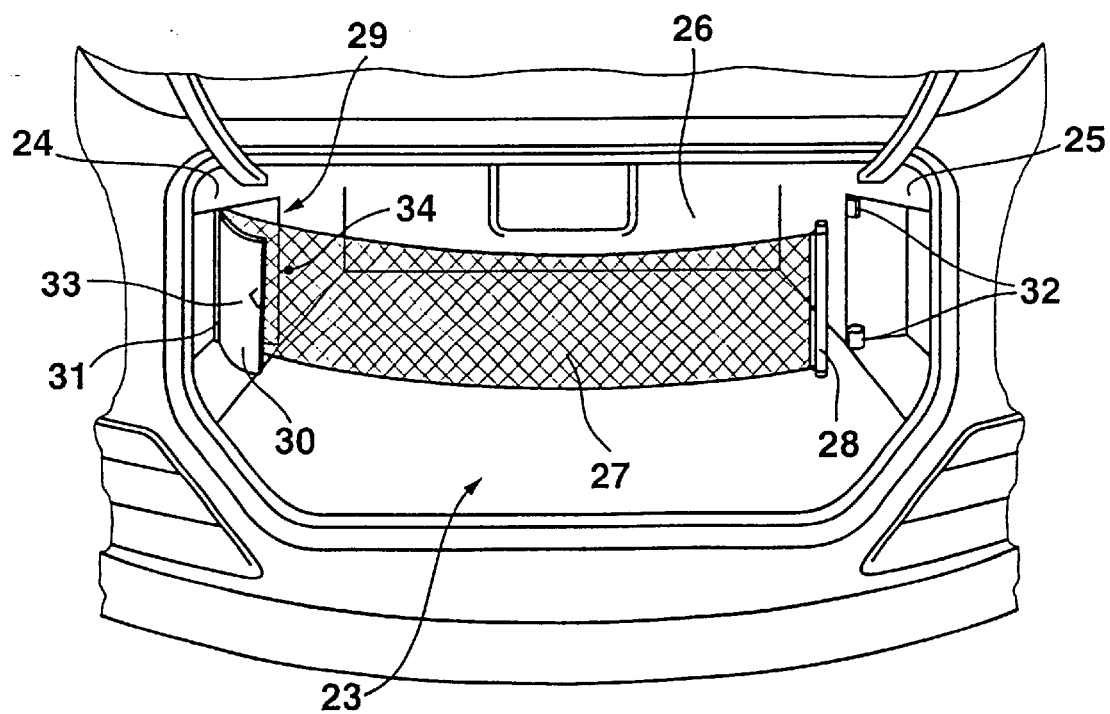
FIG. 8 shows an additional trunk compartment of a passenger car with an embodiment of the sectioning device of the invention similar to FIG. 1.
Figure 9:
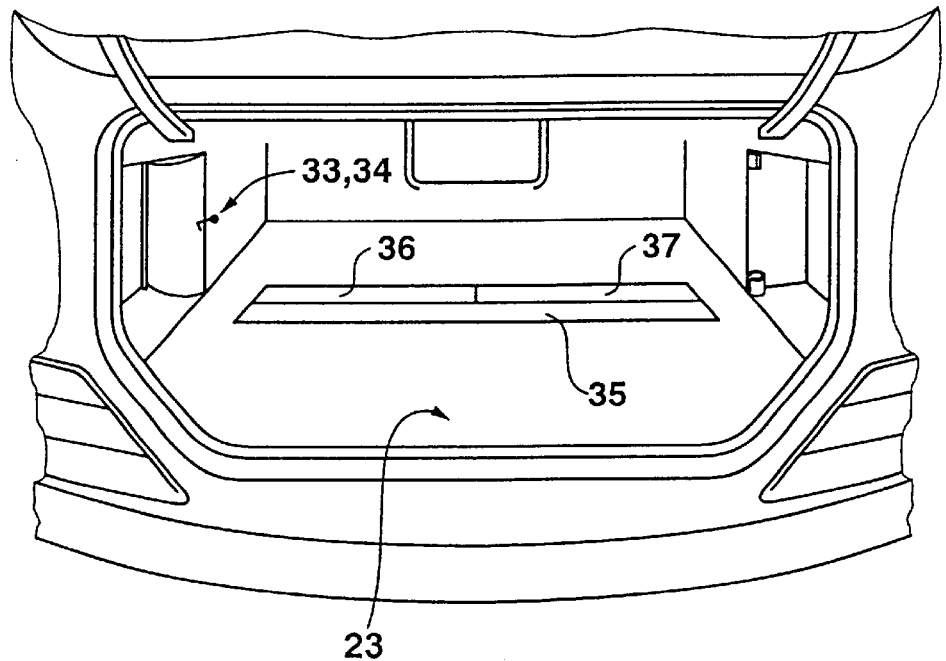
FIG. 9 shows another embodiment of a trunk compartment of the invention in which the sectioning device is in a sunken rest position.
Figure 10:
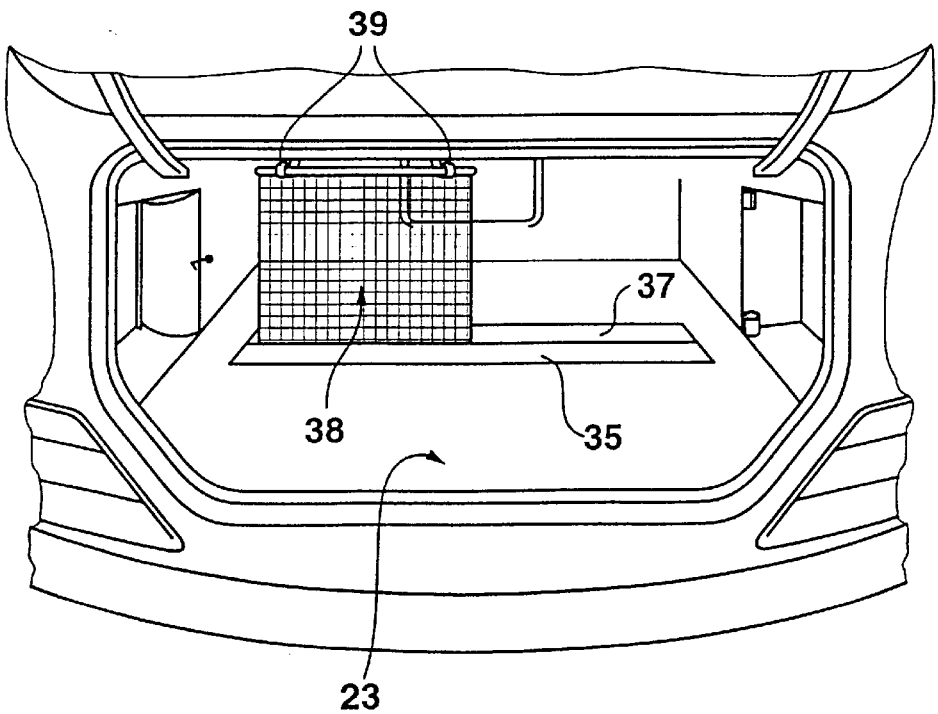
FIG. 10 shows the trunk compartment of FIG. 9 wherein a flexible divider of the sectioning device is moved to an active position.
Figure 11:
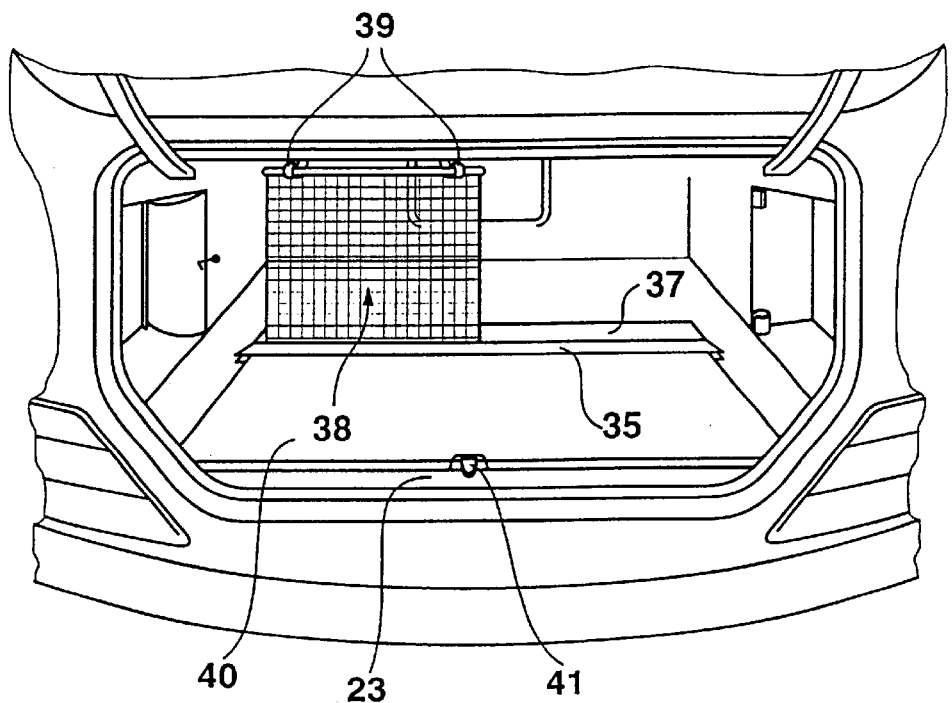
FIG. 11 shows the trunk compartment of FIGS. 9 and 10, in which a concealing curtain is drawn to a fully deployed position.
Figure 12:
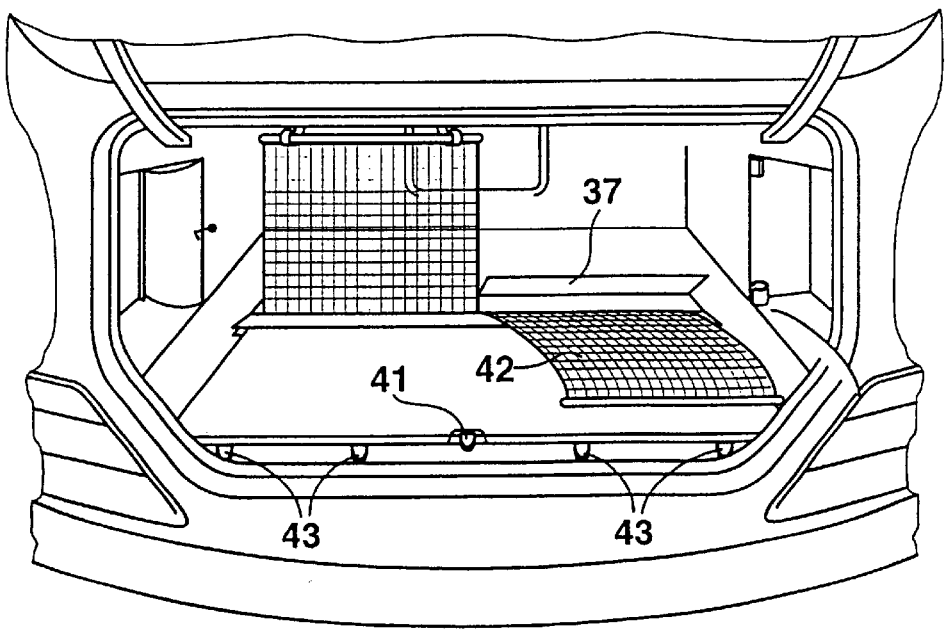
FIG. 12 shows the trunk compartment of FIGS. 9 to 11, in which an additional flexible curtain is in an intermediate position just before its active position.

The embodiment in FIG. 8 is substantially similar to the embodiment previously described in connection with FIG. 1. Also the sectioning device of FIG. 8 has a barrier 27 configured as a flexible curtain which can be drawn like the device in FIG. 1 across the width of the vehicle out of a side wall 24 that is a boundary surface of the trunk compartment. The barrier 27 can be wound onto a roller shaft mounted in a vertical alignment in a cavity 29 in the side wall 24. The cavity 29 in the side wall 24 can be shut with a cover in the form of a flap 30 which can turn on a hinge 31 on the side wall 24. In the deployed state the barrier 27 reaches across the trunk compartment and divides the same into a front portion defined by the front wall 26 and by the barrier 27 at the rear, and a corresponding rear portion. The barrier 27 stands on a trunk compartment floor 23 in its deployed position and is stretched out in this deployed position in which it is held by a pull-out bar 28 in holders 32. To achieve tautness, either a stop means is associated with the roller shaft or the barrier 27 is of a length determined by the width of the trunk compartment such that, in the suspended state it is drawn all the way out to the end. The flap 30 can be kept closed by a simple catch 33 and 34. Of course, other forms of catch means may be provided in order to hold the flap 30 in its closed position in which it conceals the barrier 27 in its withdrawn rest position. These include spring systems which exert a return tension on the flap and hold it in the closed position.

In the embodiment in FIGS. 9 to 12, still another dividing system for the sectioning device is provided in addition to the barrier in FIG. 8, which is contained in a side wall of the trunk compartment, and it is recessed in the trunk compartment floor 23. These parts of the sectioning device are fundamentally the same in structure and function as an embodiment that was previously described in connection with FIGS. 3 to 7. In the present embodiment according to FIGS. 9 to 12, the corresponding barriers 38, 40 and 42 are not contained in a separate box housing that can be removed from the vehicle, but instead are held directly in corresponding recesses in the trunk compartment floor 23. For this purpose storage compartments are provided in the recesses for the barriers in their rolled-up rest state. The sectioning device integrated into the trunk compartment floor 23 has the recesses in the form of cavities which are closed each by a cover 35 to 37 in the form of flaps. The flaps 36 and 37 are arranged side by side and each covers half of the width of the covering flap 35 which is directly behind and parallel with the flaps 36 and 37. When the corresponding flaps 35, 36 and 37 are opened, the barrier in question 38, 40 and 42, can be drawn out by hand to its deployed state and attached to holding means 39, 41 and 43 affixed to the vehicle. The rear end of each barrier, still lowered in its particular recess, is likewise held in the recess either by being affixed to a roller shaft or else directly in holders affixed to the vehicle inside of the recess. The holders are hanging hooks for pull-out bars on the barriers 38, 40 and 42; these hooks 39, 41 and 43 can be turned to an inactive position or to their active position to receive the pull-out bar in question. The suspension hooks 39 are held on a roof, i.e., the upper side of the trunk compartment, serving as a boundary surface. The hooks 41 and 42 are mounted on a back of the trunk compartment floor 23. The covering flaps 35 to 37 can be provided, in a manner not shown, with handles for ease in opening and closing. They can be held in their closed position by appropriate spring systems or in any other manner. Instead of spring systems, locks, catches or other tensional or interlocking means can be provided.

Figure 13:
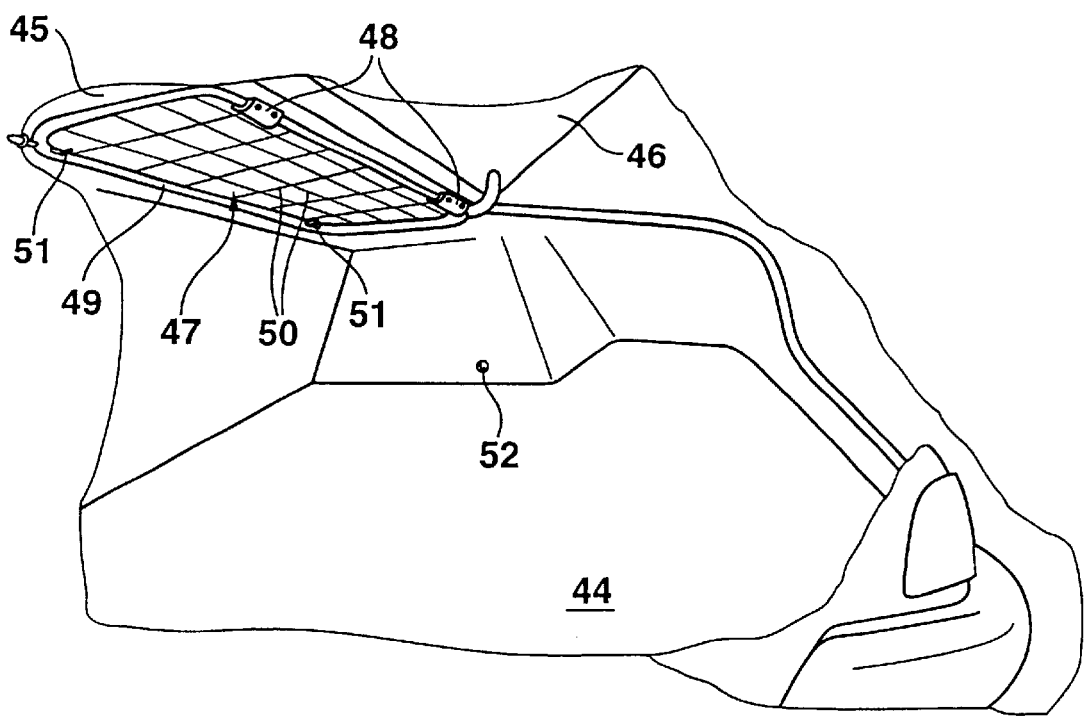
FIG. 13 shows another embodiment of a trunk compartment of the invention, which is provided with an embodiment of a sectioning device of the invention.
Figure 14:
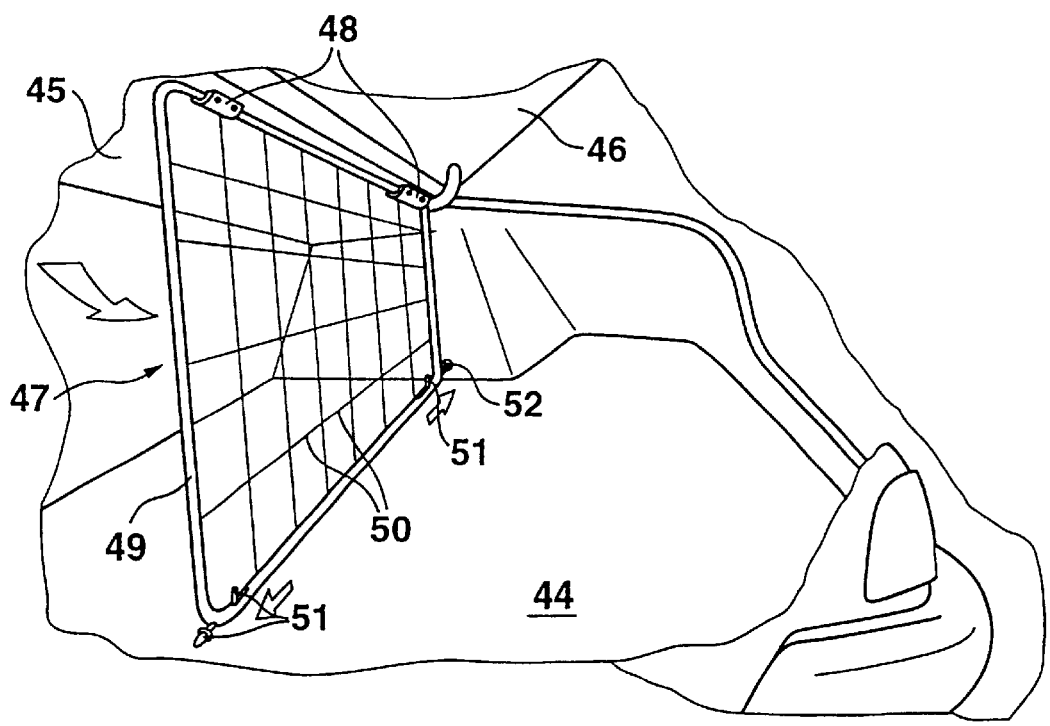
FIG. 14 shows the trunk compartment of FIG. 13, wherein the sectioning device is shown in its active position.
Figure 15:
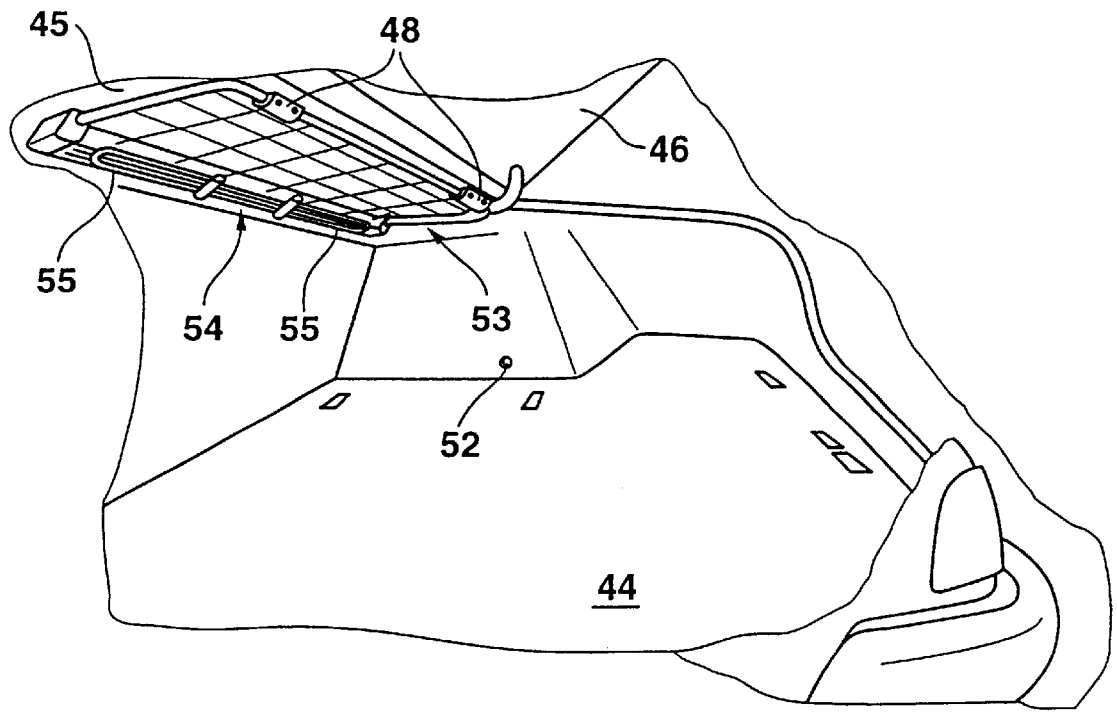
FIG. 15 shows another embodiment of a trunk compartment of the invention, which is provided with another embodiment of the sectioning device of the invention.
Figure 16:
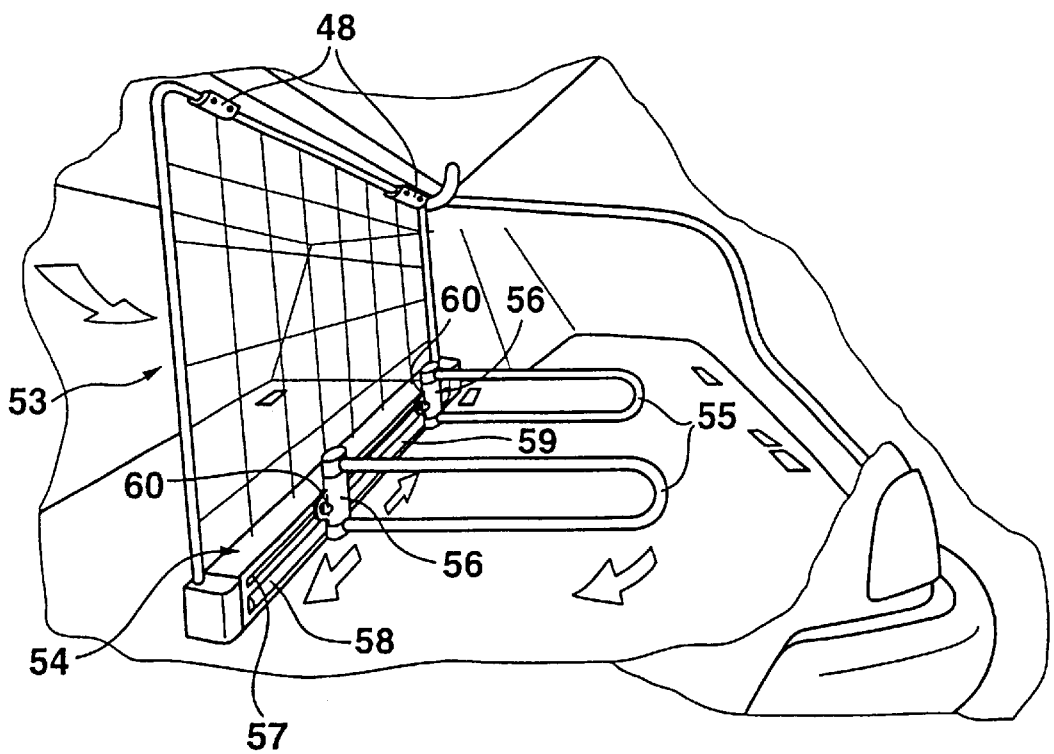
FIG. 16 shows the trunk compartment of FIG. 15 wherein the sectioning device of FIG. 16 is shown in its deployed position.

A trunk compartment serving as a freight compartment in a passenger car according to FIGS. 13 and 14 is provided with a trunk compartment floor 44 and with a roof 45 which in the forward direction of the vehicle's length adjoins a cut-out for a trunk compartment lid 46. The roof 45 is underneath the back shelf of the vehicle's interior. On the roof 45 a sectioning device 47 is provided, which is formed by a quadrangular and closed frame 49 of stable shape as well as a barrier, here in the form of a net 50, stretched in the frame 49. This sectioning device is a barrier 47 which in an active position (FIG. 14) separates a front section of the trunk compartment from a rear section. The frame 49 is mounted so as to swing on a hinge system 48 on the roof 45 about a horizontal axis running across the vehicle. The frame 49 including the net 50 can be locked either in its rest position (FIG. 13) or in its deployed position (FIG. 14) by means of the associated two sliding catches 51 and associated holders 52 affixed to the vehicle. For that purpose a sliding bolt 51 which can be extended linearly outward is integrated in the lower (in FIG. 14) longitudinal member of the frame 49, and is linearly displaceable from a rest position in which frame 49 is released to a locking position holding the frame 49 on the holder 52. Holders 52 affixed to the trunk compartment are in like manner provided on the roof 45 of the trunk compartment, and the sliding bolts 51 enter into them with the frame 49 and barrier 47 when in the rest position. The sliding bolts 51 thus form both locking means for the active position and securing means for the barrier 47 in the rest position. It is, however, also possible to provide separate securing means for the rest position which will hold the barrier 47 on the roof.

An additional embodiment of a trunk compartment according to the invention, with an additional embodiment of a sectioning device of the invention, has in FIGS. 15 to 18 a barrier 53 which like the embodiment in FIGS. 13 and 14 is provided with a frame of stable shape. The frame is provided with a barrier in the form of a net stretched within the frame and mounted so as to rotate about a hinge 48 on the roof 45 of the trunk compartment, like the embodiment in FIGS. 13 and 14.

Instead of a flexible net, a different flexible or stiff barrier can be provided.

Figure 17:
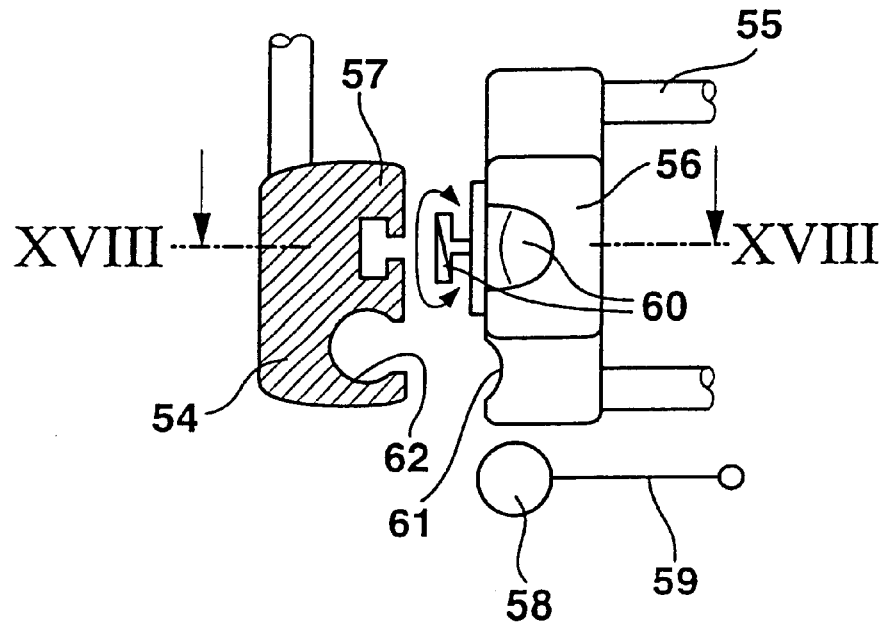
FIG. 17 shows an enlarged view of a cross section through a holding bar of a frame of the sectioning device of FIGS. 15 and 16.

A lower long member of the frame of the barrier 53 is in the form of a channel 54 to which two additional barrier units in the form of barrier loops 55 are connected. The two barrier loops 55 are held each by a support 56 for longitudinal displacement on the channel 54. For that purpose the channel 54 has a profile groove 57 extending over the entire length of the channel 54, and into it two sliding blocks 60 of the support 56. The support 56 is releasably held in the profile groove 57. The sliding blocks 60 are mounted so as to be able to be rotated 90° with the aid of a handle on the support 56 (FIG. 17). On the other hand the sliding blocks 60 engaged in the profile groove 57 are of rectangular shape, a narrow side fitting in the width of the insertion slot in the profile groove 57 and a wide side of the sliding block 60 fitting in the width of the profile groove 57 itself. Thus, by a rotation of 90° it is possible to insert the sliding blocks 60 through the insertion slot into the profile groove 57 and then, by another rotation of 90°, they can be held positively in the profile groove 57. The sliding blocks 60 thus form means by which each barrier loop 55 can be displaceable along the channel 54. The sliding blocks 60 can be made advantageously from a slippery plastic. The barrier loops 55 in their active position shown in FIG. 16 reach rearwardly from the channel 54, so that they divide the freight compartment floor into a total of three sections. The barrier loops 55 are steplessly displaceable along the profile groove 57 of channel 54. To lock the barrier loops in a desired position a clamping profile 58 is provided, which is integrated into a matching profile 62 of the channel 54. The clamping profile 58 is able to rotate on its longitudinal axis by a certain amount within the groove 62, but the clamping profile 58 does not have a circular cross section but, at least in sections, an unround and thus excentric cross section.

The clamping profile 58 reaches outwardly by a certain amount beyond the groove 62 and is embedded in a mating indentation 61 in the support 56. The clamping profile 58 extends slightly beyond the length of the profile groove 57. To be able to rotate the clamping profile 58 by hand, the clamping profile 58 is provided at the approximate level of the middle of the vehicle with a central handle 59 extending radially rearward. By rotating the clamping profile 58 a clamping or release of the support 56 is achieved due to the unround, eccentric shape, since the clamping profile 58 extends, depending on its position, slightly more or less beyond the back contour of the channel 54, and thus grips or releases the support 56 at the level of the indentation 61.

In addition to the linear displaceability of the two barrier loops 55, the latter can be rotated into a rest position (FIG. 15) in contact with the channel 54. For that purpose each barrier loop 55 is mounted in the support 56 for rotation about a vertical axis. The barrier loop 55 is secured both in its active position (FIGS. 16 and 18) and in its rest position (FIG. 15) by a catch system. Each barrier loop 55 is provided in the area of its support 56 with an eccentric supporting member 66 (FIG. 18) which is secured by means of a supporting block 63,65, which can be moved by means of a leaf spring 64 within the support 56. The leaf spring 64 is held in a slot in the linearly displaceable supporting block 63, 65, and thrusts outside of the supporting block 63, 65, against corresponding surfaces of the support 56.

Figure 18:
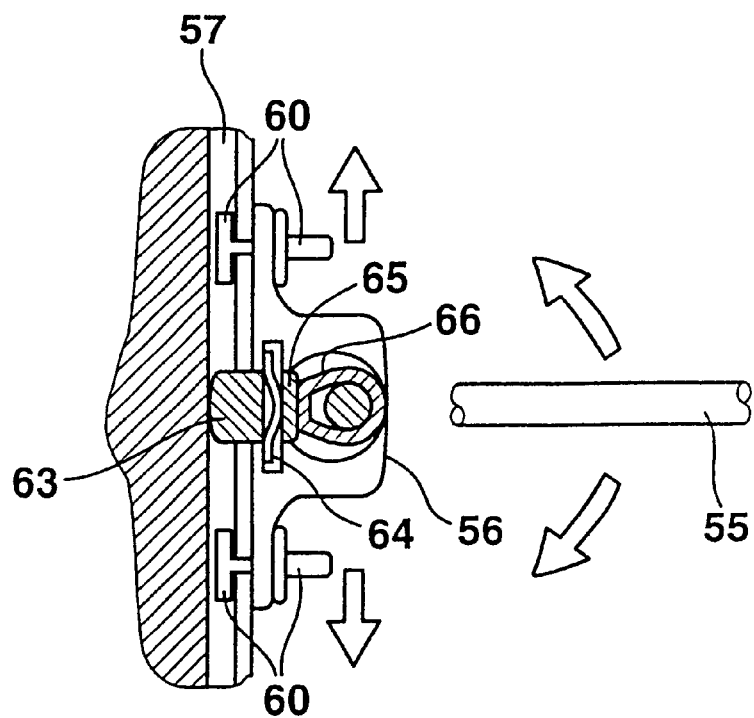
FIG. 18 shows a longitudinal section through the holding bar of FIG. 17 taken along line XVIII—XVIII in FIG. 17, enlarged.

Also in the folded rest position (FIG. 15) the supporting member 66 of the barrier loop 55 is provided with planar contact surfaces, not further designated, which in the rest position of the barrier loop 55 thrust broadly against the supporting surface 65 of the supporting block 63, 65. The planar thrusting surfaces of the supporting member 66, as shown in FIG. 18, are opposite one another offset by 90° from the supporting surface 65 and thus on the upper side and on the lower side of the supporting member 66. On account of the supporting surfaces described, each barrier loop 55 is held stable both in its active position and in its folded rest position.

Figure 19:
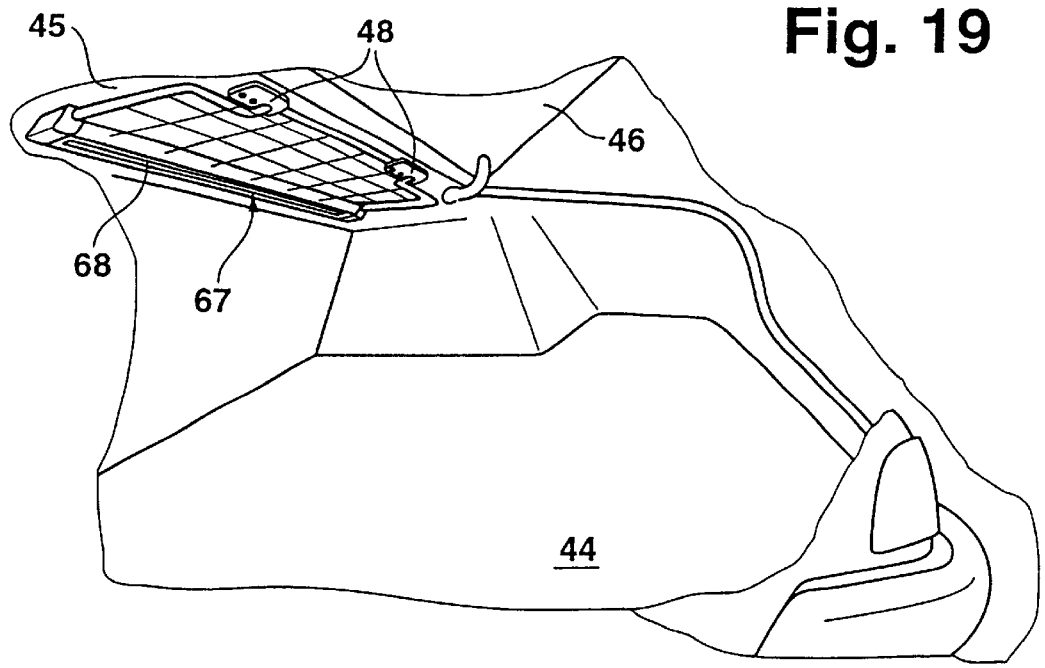
FIG. 19 shows another embodiment of a trunk compartment of the invention, with another embodiment of a sectioning device of the invention.
Figure 20:
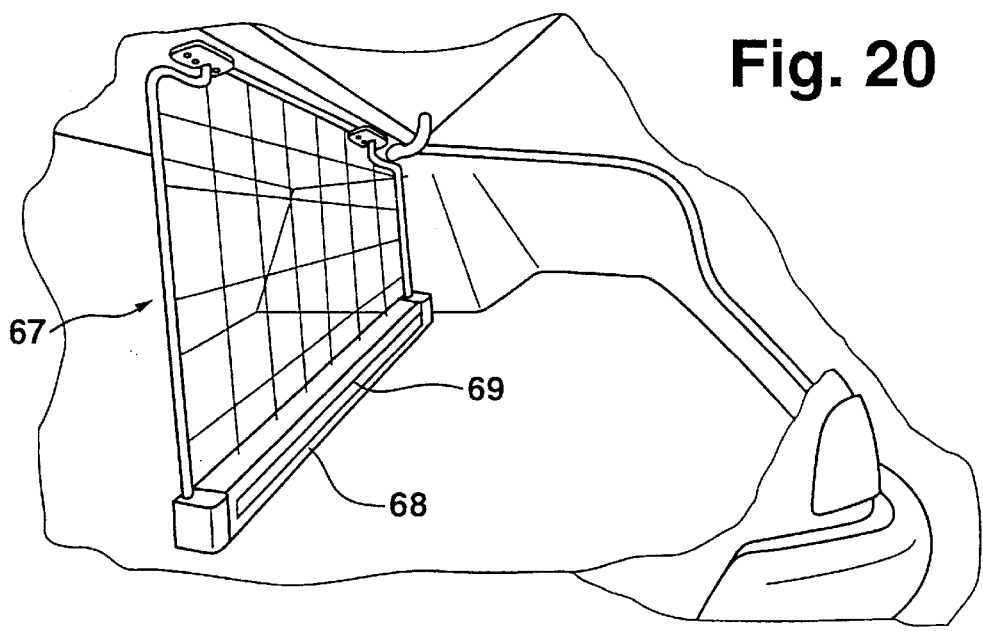
FIG. 20 shows the trunk compartment of FIG. 19 wherein the sectioning device is turned to the deployed position.
Figure 21:
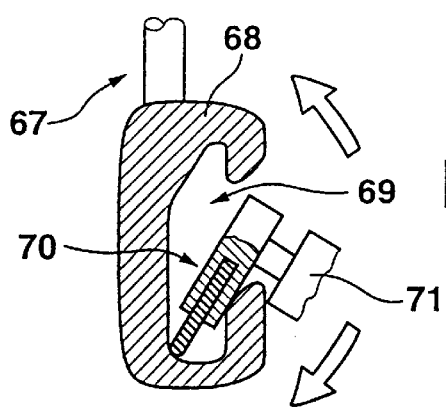
FIG. 21 shows an enlarged view of a cross section through a holding bar of a frame of the sectioning device of FIGS. 19 and 20.

In the embodiment according to FIGS. 19 to 21, a barrier 67 is provided which has a frame as well as a screen stretched in the frame. The frame is suspended in hinges 48 on a roof 45 of the trunk compartment. Like the embodiment according to FIGS. 15 to 18, a lower member of the frame is formed by a channel 68 which extends over the entire width of the trunk compartment and thus over the entire width of the frame. The channel 68 is provided with a receiving groove 69 of polygonal shape which is made substantially higher in comparison with a narrower insertion slot. The receiving groove 69 serves for the releasable mounting of additional function devices 71 which may be of various kinds. The function device 71 in FIG. 21 is a merely indicated box housing in which a tarpaulin is rolled up for the freight compartment floor 44. In like manner, however, differently configured function systems provided with different functions can be locked in the receiving groove 69.

All function device 71 have it in common that they can be locked releasably in the groove 69 by means of at least one mounting foot 70. In the embodiment shown, such a mounting foot 70 has at least one spring-biased holding pin which can be pushed into a housing of the mounting foot by certain amount, against the force of a return spring. In order to lock the function device 71 in the receiving groove 69 by means of the at least one mounting foot 70, the latter is introduced at an angle as shown in FIG. 21 into the receiving groove 69 and forced downward until an upper edge of the mounting foot 70 can pass the upper margin of the insertion slot of the receiving groove 69. Then the function device 71 including the mounting foot 70, is turned upwardly in the direction of the arrow, so that the mounting foot catches behind the upper edge of the insertion slot and is held securely in the receiving groove 69. An upper section of the receiving groove 69 is provided with a bevel not shown, which produces a clamping of the upper section of the mounting foot 70, since the supporting pin, due to spring bias, forces the housing of the mounting foot 70 upward. To release the mounting foot 70 and thus the function device 71, the entire unit is forced downwardly causing the supporting pin to enter the housing. Then the mounting foot 70 can be turned forward and downward and then removed.

Not all of the features described with the aid of the different embodiments are limited to the described combinations of features, but can be combined together according to the established requirements in other assemblages. Instead of the individual sectioning devices represented, a plurality of sectioning devices can be provided in the trunk compartment. All of the sectioning devices described can be provided in like manner also in freight compartments of combination passenger cars or other motor vehicles.

What is claimed is:

1. Sectioning device for a trunk space of a motor vehicle, which has at least one flexible barrier or one of stable shape at least sectionally which can be aligned in the trunk space and fixed to the vehicle, wherein the barrier has one frame of stable shape which is journaled on a wall of the trunk space so as to be turnable between a rest position in contact with the wall and an active position dividing the trunk space into at least two spaces, the frame extending in the active position between a floor and a roof of the trunk space.

2. Sectioning device according to claim 1, wherein a stopper is provided on the frame which holds the frame in the active position on a corresponding holder fixed to the trunk space.

3. Sectioning device according to claim 2, wherein a securing element for holding the frame in the rest position in contact with the wall are associated with the frame.

4. Sectioning device according to claim 1, wherein the frame is provided on at least one side with a holding profile on which additional function devices can be releasably fastened.

5. Sectioning device according to claim 4, wherein at least one sectioning unit is provided as a function device which can be aligned to the active position of the frame.

6. Sectioning device according to claim 5, wherein the sectioning unit has a sectioning loop which by way of a support is disposed for longitudinal displacement on the holding profile.

7. Sectioning device according to claim 6, wherein a lock is associated with the sectioning loop to lock the sectioning loop in any desired intermediate position.

8. Sectioning device according to claim 7, wherein a clamping profile extending over at least approximately the entire length of the holding profile is provided, which is spatially associated with the support and is sunken at least partially in the holding profile and can turn about a longitudinal axis, the clamping profile being made off-center from the longitudinal axis at least in sections such that the support can be locked or released when the clamping profile is turned relative to the holding profile.

9. Sectioning device according to claim 6, wherein the sectioning loop is mounted for turning on the associated support between a folded rest position and a deployed active position.

10. Sectioning device according to claim 9, wherein the sectioning-loop can be secured by way of a catch system in the deployed position and/or in the folded rest position.

11. Sectioning device according to claim 2, wherein the frame is provided on at least one side with a holding profile on which additional function devices can be releasably fastened.

12. Sectioning device according to claim 3, wherein the frame is provided on at least one side with a holding profile on which additional function devices can be releasably fastened.

13. Sectioning device according to claim 7, wherein the sectioning loop is mounted for turning on the associated support between a folded rest position and a deployed active position.

14. Sectioning device according to claim 1, wherein the frame is journaled to one of the floor and roof of the trunk space.

* * * * *